(No Model.)  5 Sheets—Sheet 1.

G. R. PROWSE.
CALCIUM LIGHT APPARATUS.

No. 463,870.  Patented Nov. 24, 1891.

Witnesses.  Inventor.
W. Décarie  George Roger Prowse
A. Broderick  By his Attorney
 Charles G. C. Simpson (No Model.)

5 Sheets—Sheet 2.

G. R. PROWSE.
CALCIUM LIGHT APPARATUS.

No. 463,870. Patented Nov. 24, 1891.

Witnesses.
W. Décarie
A. Broderick

Inventor.
George Roger Prowse.
By his Attorney
Charles G. C. Simpson (No Model.) 5 Sheets—Sheet 3.

G. R. PROWSE.
CALCIUM LIGHT APPARATUS.

No. 463,870. Patented Nov. 24, 1891.

Witnesses.
W. Décarie
A. Broderick

Inventor.
George Roger Prowse
By his Attorney Charles G. Simpson

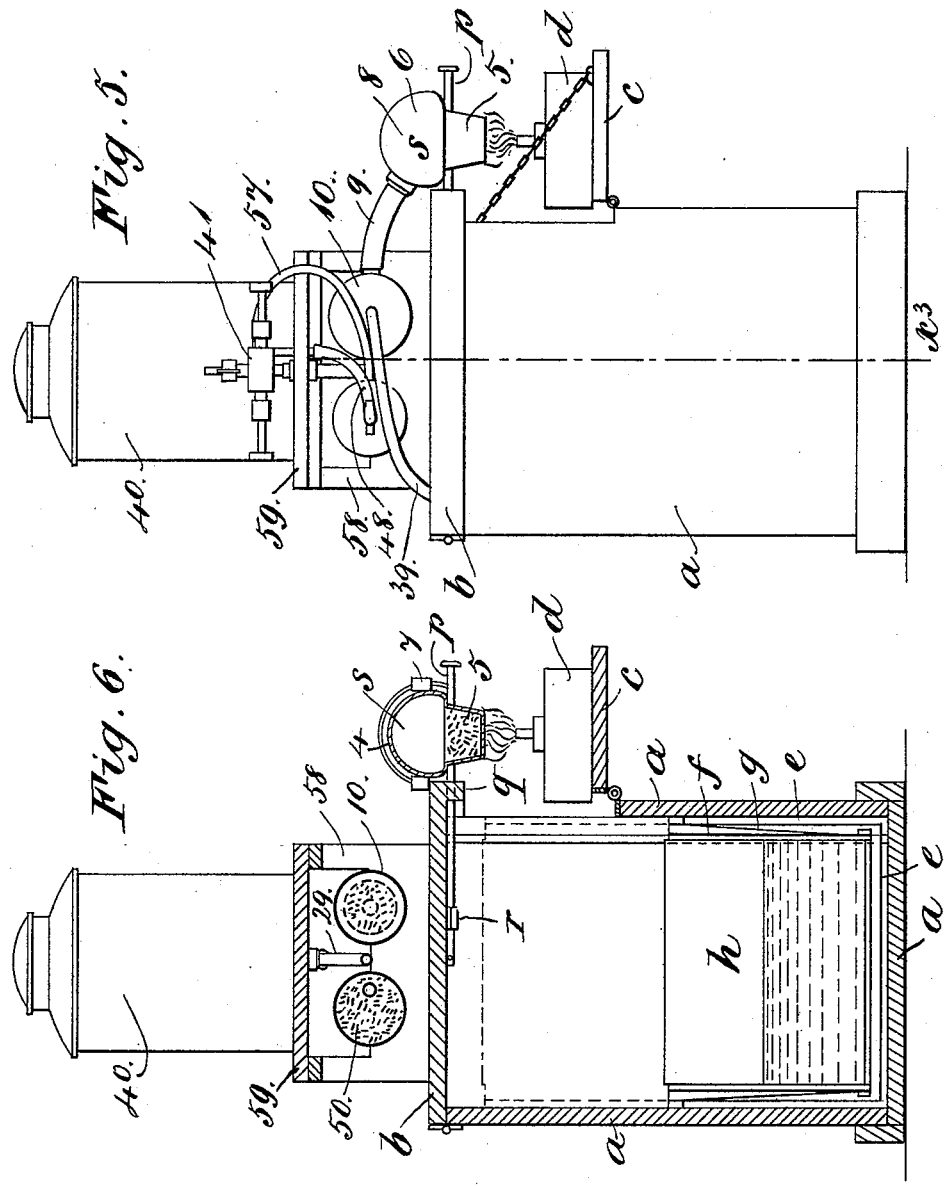

(No Model.) 5 Sheets—Sheet 5.

G. R. PROWSE.
CALCIUM LIGHT APPARATUS.

No. 463,870. Patented Nov. 24, 1891.

Witnesses.
W. Décarie
A. Broderick

Inventor.
George Roger Prowse
By his Attorney.
Charles G. Simpson

UNITED STATES PATENT OFFICE.

GEORGE ROGER PROWSE, OF MONTREAL, CANADA.

CALCIUM-LIGHT APPARATUS.

SPECIFICATION forming part of Letters Patent No. 463,870, dated November 24, 1891.

Application filed April 2, 1891. Serial No. 387,423. (No model.)

*To all whom it may concern:*

Be it known that I, GEORGE ROGER PROWSE, a subject of the Queen of Great Britain, residing in the city of Montreal, in the District of Montreal and Province of Quebec, Canada, have invented new and useful Improvements in Oxygen - Generators for Calcium Lights; and I do hereby declare that the following is a full, clear, and exact description of the same.

My invention relates to improvements in the construction and arrangement of the apparatus by which oxycalcium lights are produced; and the objects of my improvements are, first, to arrange an apparatus that is capable of being packed up within itself—that is to say, within the case that forms the outer shell of the device when not in use; also, to provide an apparatus that is self-contained within what is required for producing an oxycalcium light or not requiring other apparatuses in the preparation of the various parts of the invention to render it in a suitable condition for use, and therefore the apparatus is rendered completely portable and self-contained; second, to furnish improvements in the construction of the oxy-generator; third, to furnish certain improvements in the purifier; fourth, to furnish certain improvements in the saturator; fifth, to furnish certain improvements in the gas-receiver; sixth, to so construct the whole apparatus that it may be opened, cleaned, if necessary, and prepared and arranged ready for operation in a very short time; also, such other improvements as may be hereinafter set forth.

The whole of the above is accomplished by the construction hereinafter described.

I attain the above-mentioned objects in the apparatus illustrated in the accompanying drawings, in which similar letters and numerals of reference indicate like parts.

Figure 1:
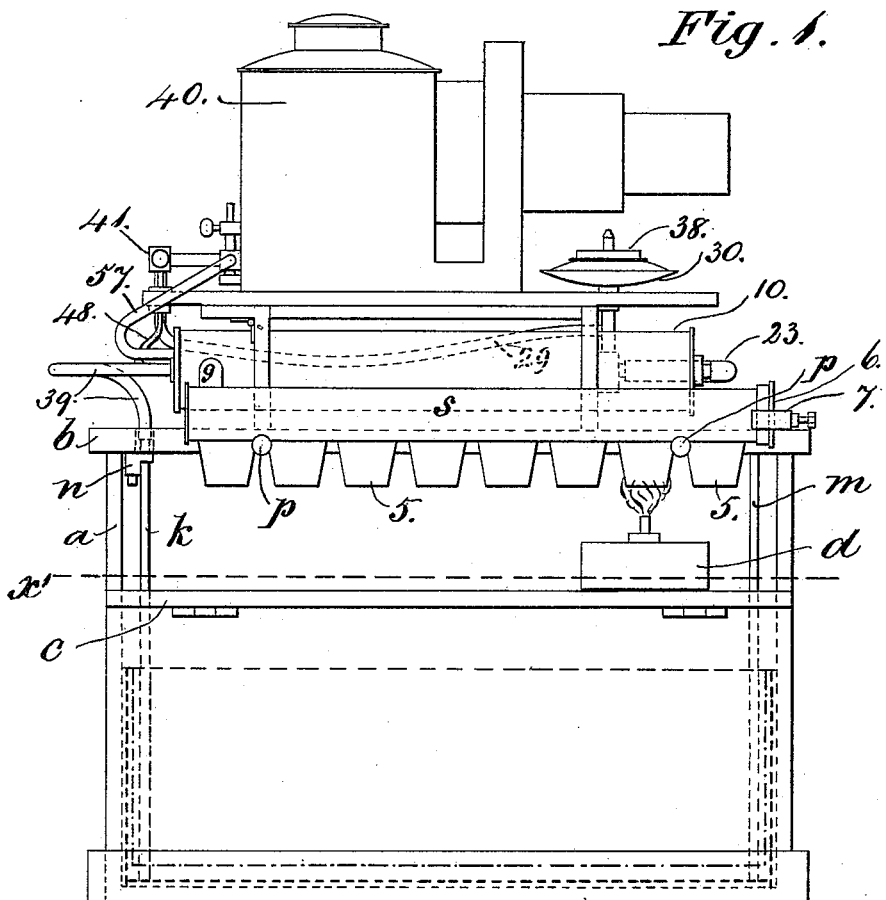
Figure 8:
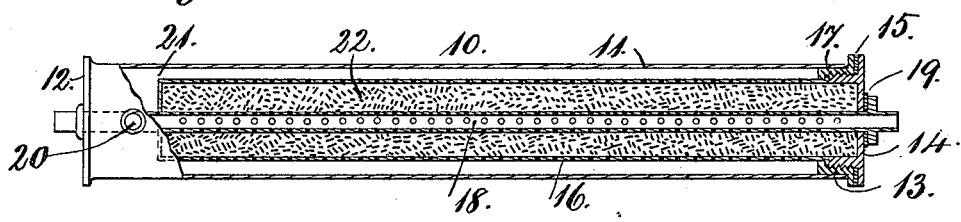
Figure 2:
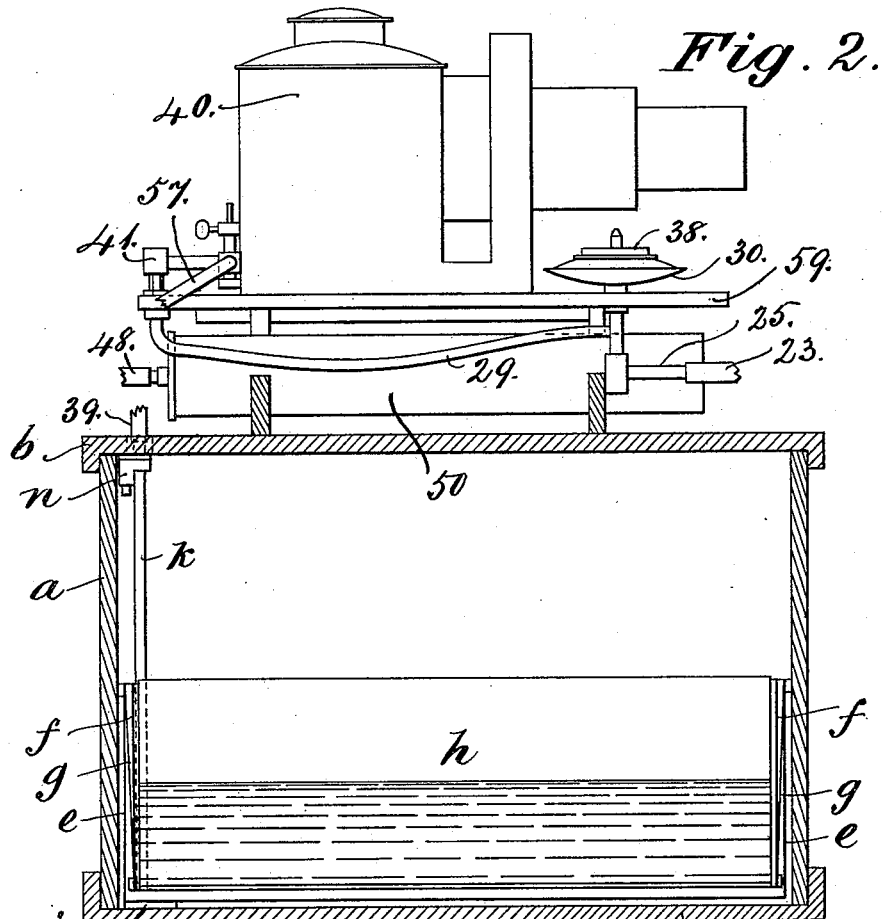
Figure 9:
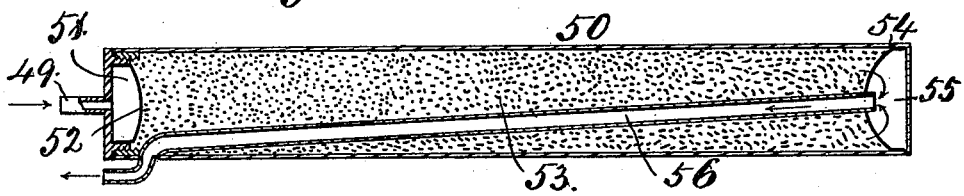
Figure 1:
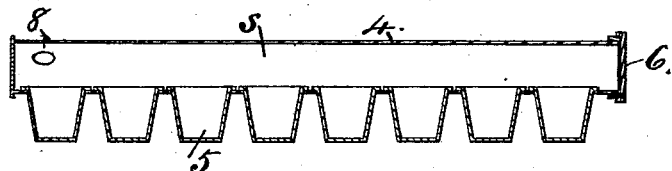
Figure 4:
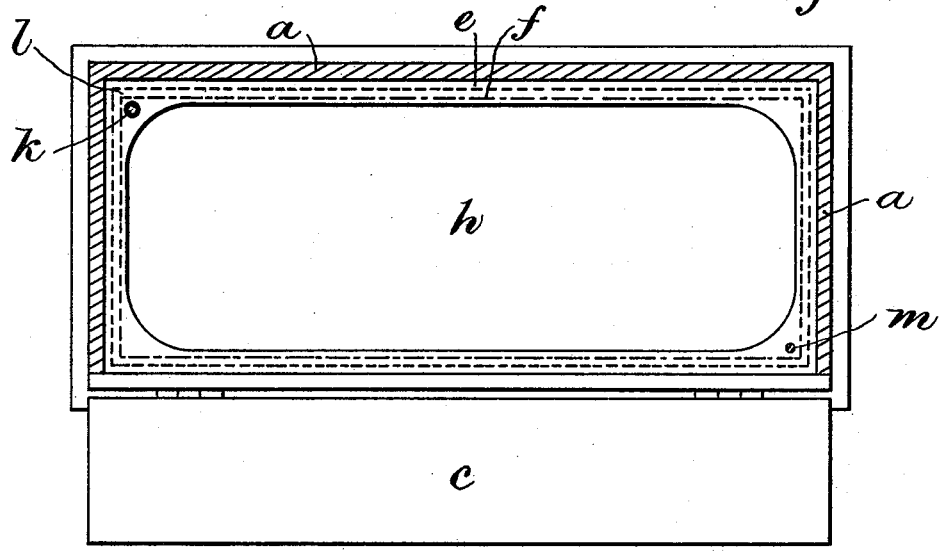
Figure 3:
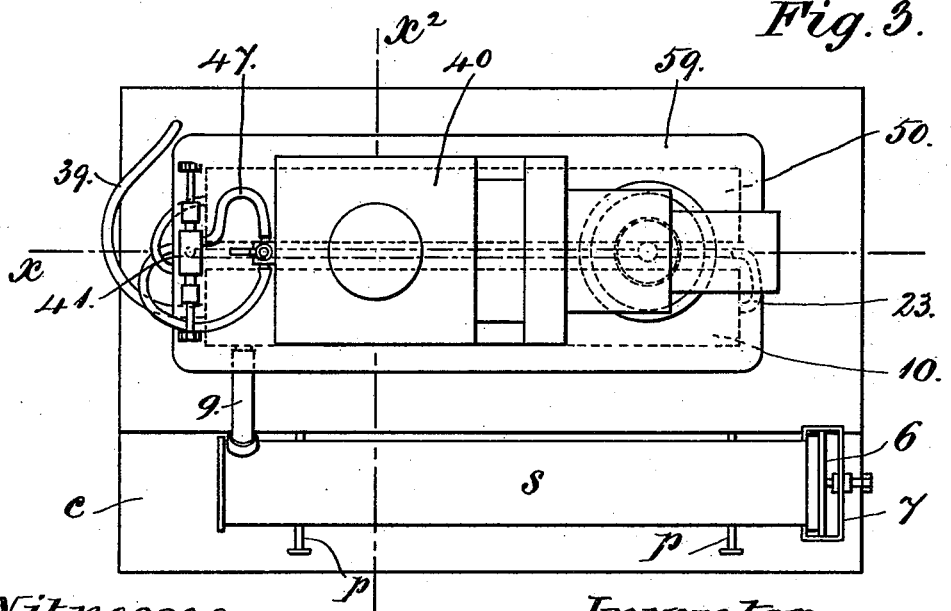
Figure 12:
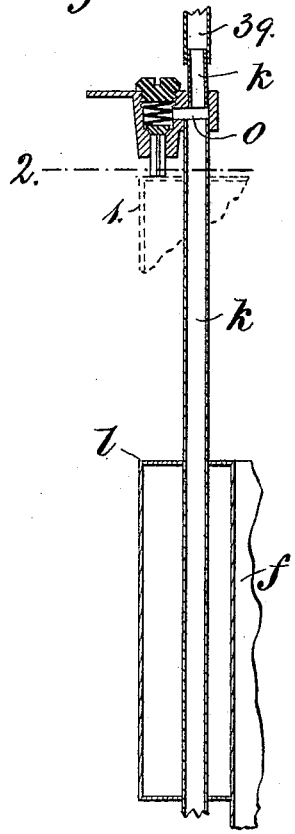
Figure 10:
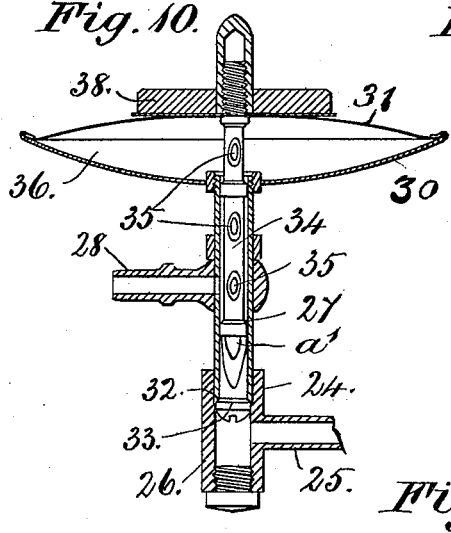
Figure 11:
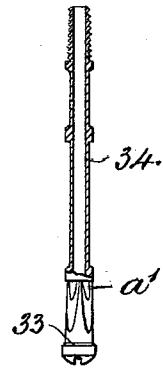
Figure 13:
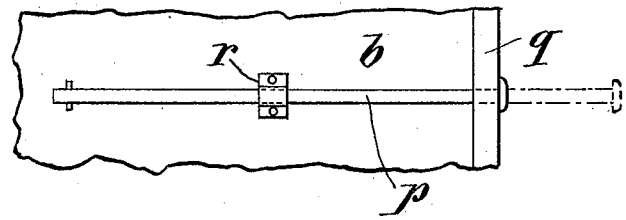
Figure 14:
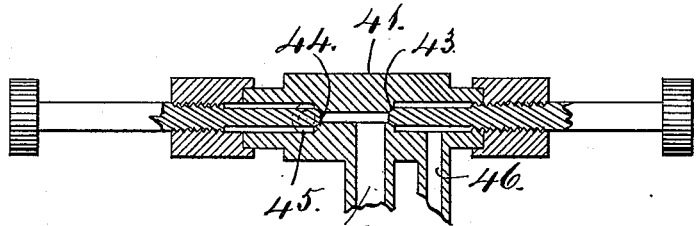

Figure 1 is a side elevation of the oxycalcium-light apparatus embodying my invention. Fig. 2 is a longitudinal vertical section of the apparatus shown in Fig. 1, taken about the position of the line $x$ in Fig. 3 or line $x^3$ in Fig. 5, with the parts of the invention situated above the entablature 59, shown in elevation. Fig. 4 is a horizontal section on line $x'$, Fig. 1, of the lower part of the apparatus, the lamp $d$ being omitted. Fig. 5 is an end elevation of the apparatus shown in Fig. 1. Fig. 6 is a transverse vertical section of the apparatus, taken about the position of the line $x^2$ in Fig. 3. Fig. 7 is a longitudinal vertical central section of the generator. Fig. 8 is a longitudinal central horizontal section of the purifier. Fig. 9 is a horizontal central longitudinal section of the saturator. Fig. 10 is a vertical central section of the automatic regulator. Fig. 11 is a detail, being in part section and part elevation of the spindle 34 and valve 33, detached. Fig. 12 is a section of the guide-tube $k$ and escape-valve $n$ in connection therewith. Fig. 13 is a plan of the under side of the cover $b$, showing the arrangement of the supports $p$ therewith. Fig. 14 is a central vertical section of part of the valve-chest 41, by which the intermingling and proportioning of the gases are controlled.

Letter $a$ is an ordinary box, preferably provided with a hinged cover $b$, having a portion of the top part $c$ of the front hinged, so that by turning it down to a horizontal position it forms a shelf to support a lamp $d$. (Shown only in Figs. 1, 5, and 6.) In the lower part of the box $a$ is situated and secured a vessel $e$, being, as nearly as can conveniently be got, the full size of the inside lower part of the space. Within this is a vessel $f$. To the top of the outer vessel $e$ and the bottom of the vessel $f$ a flexible diaphragm $g$ is attached, extending all the way round and arranged to be perfectly air-tight. Within the vessel $f$ is a removable vessel $h$, nearly filling it. This is adapted to hold water, as illustrated in Figs. 2 and 6, so that the water contained in the vessel $h$ may give to any gas contained in the gas-receiver formed by the vessels $e$ and $f$ and diaphragm $g$ the required pressure by the gravity of the water. As gas from the generator (as will be hereinafter more particularly mentioned) is forced into the gas-receiver with sufficient force to overcome the weight of the water contained in the vessel $h$, the vessel $f$ rises, the flexible diaphragm $g$ accommodating itself to the various positions and preventing the escape of the gas from the receiver thus formed.

$i$ is a hollow projection formed on the bottom of the vessel $e$. To this is connected a vertical guide-tube $k$, through which the gas is forced into the receiver or space between the vessels $e$ and $f$, and by forming a projection $l$ (see Fig. 12) on the vessel $f$ to engage with the tube $k$ this tube is thereby adapted to serve also as a guide to the vessel $f$ in its upward and downward motions.

With the tube $k$ is connected a safety or relief valve $n$, so that before the vessel $f$ has reached the full extent of the upward travel allowed it by the diaphragm $g$, and coming to the position shown in dotted lines marked 1 in Fig. 12, it reaches the bottom extremity of the valve $n$, and should it rise to the height indicated by the line 2 it is evident that the valve will be raised and allow the gas to escape through the passage $o$ and by the valve, thus relieving the gas-receiver from any danger of being burst by the superfluity of the generation of gas.

The advantages of using water as a weight in the vessel $h$ are that it saves the expense of providing solid weights for the purpose, and it saves the trouble and annoyance of having to transport the solid weights about from place to place with the apparatus when it is used for itinerant exhibitions, as water can always be obtained in any place where persons are living. The water also adapts itself in the vessel $h$ to an equal pressure all over, whereas weights if not properly placed would not do so.

The cover $b$ of the box $a$ is provided with two sliding bars $p$, guided by passing through openings formed in the front cleat $q$ of the cover and by bearings $r$, attached under the cover. (See Figs. 5, 6, and 13.) Thus a means of supporting the generator about to be described is provided, which occupies little or no room when the apparatus is closed up for transportation or otherwise.

The generator $s$ consists of a tube 4, preferably made of the configuration shown in cross-section in Fig. 6 and in longitudinal section in Fig. 7. The tube proper 4 is made of a material having a heat-conducting power of less than the material of the receptacles 5, which, as shown, are eight in number; but may be in this respect as desired. I have found that a very good effect is produced by making the tube 4 of iron and the receptacles 5 of copper on account of the difference of heat-conductive power of the two metals, but other substances or materials may be used, if desired. As shown, the tube 4 is permanently closed at one end and provided with a removable cover 6 at the other end, secured by a clamp 7 (see Fig. 1) or other desired means of holding the cover 6 firmly in place. This generator forms a retort, the vessels 5 having placed in each of them a charge of chlorate of potash and black oxide of manganese. The vessels so charged are alternately acted upon, as desired, by the heat of the lamp $d$, (or any other desired heat-generator,) according to the size of the receptacles 5 and the amount of heat applied to them. The charges may be sufficient for generating the amount of gas required for an oxycalcium light, hereinafter mentioned, for any given amount of time. We will suppose the charge in each of the vessels or receptacles 5 to be sufficient for about half an hour, and the receptacles being eight in number the charges contained in the generator $s$ will be sufficient to keep the light in operation for four hours, or more than what is required for any ordinary performance or exhibition.

The heat being applied to one of the receptacles 5, at first little or no gas is formed; but after a short while the generation of gas becomes greater than what is required for the light, in which case the surplus is forced into the receiver, and as the charges of the receptacles 5 become exhausted the generation of gas becomes less than that required for the light, at which time the gas stored in the receiver (which forms a reservoir) is available to keep the light in full operation.

8 is an orifice in the tube 4, situated at any convenient place for the escape of the gas from the generator. To this is connected a flexible tube 9.

By forming the receptacles 5 of greater heat-conductive power than the tube 4 the heat applied is confined, principally, to the receptacle upon which the lamp $d$ acts, and the gas is rapidly generated therefrom, whereas were the whole generator formed of material of high conductive power the whole generator would have to be heated up to the necessary temperature before any gas would be generated, requiring considerable time, and when so heated up the gas would be too rapidly generated therefrom. Again, by forming the receptacles 5 of copper or other material of highly-conductive power and forming the tube 4 of iron or other material of comparatively low conductive power the above-mentioned effect will be satisfactorily attained.

Notwithstanding what has been said above, a satisfactory result might be attained by forming the generator $s$ entirely out of material having a low conductive heat power, such as iron, &c., because the heat would thereby be prevented from extending too rapidly from the receptacle 5, acted upon by the lamp $d$; but the action in this case would be much slower for the amount of heat employed and would not, on the whole, be anything like as satisfactory as where materials of different conductive powers are used in a manner substantially as above described. The gas generated passes by the tube 9 to the purifier 10, Fig. 8. This, as shown, consists of a tube 11, having one end 12 fixed and the other end provided with a socket 13, screw-threaded to receive a correspondingly-screw-threaded cap 14, the joint between the two being made air-tight by a flexible washer 15.

16 is a removable perforated tube arranged to slide in through the central opening in the socket, being retained in place by a shoulder at 17, extending around its end and engaging with a corresponding shoulder on the socket 13, as shown in Fig. 8. Through the end 12 of the purifier and through the cap 14 a perforated tube 18 passes, the openings being rendered air-tight by elastic washers 19. 20 is an orifice in the tube 11, which connects with the tube 9, by which the gas from the generator passes into the space 21 between the tubes 11 and 16. It then passes through the perforations in the tube 16 and through the body of sawdust 22, with which the space between the tubes 16 and 18 is packed. This sawdust is saturated with water or an alkaline solution, the object being that as the gas passes through the saturated sawdust any chlorine contained in the gas will be neutralized, care being taken to have all the perforations in the tube 18 well covered with the saturated sawdust.

The tube 18 is connected at one end by a flexible pipe 23 to an apparatus which I shall call the "regulator," because it regulates the pressure at which the gas is supplied for consumption to the oxycalcium light. The employment of sawdust in the purifier, as above described, is looked upon as a valuable improvement on account of its cheapness; also for its absorbent qualities, which arise from its cellular construction.

The regulator consists, as shown in Figs. 10 and 11, of a socket 24, having a branch 25 to connect with the tube 23, also having the vertical portion 26 of the socket connected with a vertical pipe 27. This vertical pipe is provided with a branch 28, which connects with a flexible tube 29. On the upper end of the pipe 27 is attached a concave disk 30, to the periphery of which is attached a flexible diaphragm 31 of the same circular form. Within the pipe 27 a valve-seat is formed at 32, and within the pipe 27 is placed the valve 33. This is provided with a hollow spindle 34, the valve being cut away at $a'$ to allow the gas passing from the purifier to pass into the hollow spindle 34, which is provided with perforations 35, as shown, so that the gas may pass when the valve 33 is opened into the branch 28 and into the space 36. The upper end of the spindle 34 passes through the diaphragm 31 and is screwed to engage with the screwed cap 37. Over this cap is placed a weight 38, which causes a certain amount of pressure, as desired, to be developed by the gas passing from and in the generator before the valve closes, so that when the diaphragm 31 is inflated, as shown in Fig. 10 at 31, the valve 33 will be up to the seat and the passage of the gas from the generator is prevented from passing. As soon as the valve 33 closes the weight 38 causes the flexible diaphragm 31 to collapse, and as soon as the flow of gas from the generator and through the purifier to the regulator becomes too great to be received by or passed through the regulator by reason of the weight 38 being raised by the inflation of the diaphragm 31 the gases out of the other end of the tube 18, which is by the pipe 39 connected with the pipe $k$, and thence to the receiver hereinabove described, situated in the lower portion of the box $a$, so that the pressure of the gas supplied to the lantern 40 is completely controlled by the gravity of the weight 38, which should be so proportioned as to give a less pressure than what will be caused by the water in the vessel $h$. The gas passing by the tube 29 is conducted to a valve-chest 41 by the passage 42, (see Fig. 14,) with which the tube 29 is connected, and by opening the valves 43 and 44 the gas is divided into two parts, one part escaping by the orifice 45 and the other by the passage 46. That which escapes by the orifice 45 passes by a flexible tube 47, Fig. 3, to the burner of the lantern 40, conveying thereto the oxygen gas. The other part of the gas, escaping by the passage 46, passes by the flexible pipe 48 to the saturator by the pipe 49.

The saturator consists of a tube 50, Fig. 9, provided with a chamber 51, formed of a wire-gauze diaphragm 52, beyond which the body of the saturator is filled with sawdust 53. At its other extremity it is provided with another chamber 55, formed by another wire-gauze diaphragm 54.

56 is a tube connecting with the chamber 55, and preferably placed within the tube, forming the outer shell of the saturator 50, but may, if desired, be placed externally thereto. The gas entering by the pipe 49 passes through the sawdust into the chamber 55, and by the tube 56 and a flexible tube 57 to the burner of the lantern 40. The sawdust is saturated with a high grade of hydrocarbon oil.

By the adjustment of the valves 43 and 44 the proportions of oxygen and hydrogen compound passing to the lantern 40 can be governed with great accuracy.

From a consideration of the above-described constructions it will be seen that the gas required for the lantern 40 passes from the purifier to the regulator, and any surplus gas generated passes to the gas-receiver formed by the vessels $e\ f$ and diaphragm $g$, and should the generation of gas from the generator be at any time less than what is required for the lantern 40 the amount of gas held by the receiver is available to supply the deficiency.

The lantern 40 is of the ordinary construction. As it *per se* forms no part of the present invention, it need not be further illustrated in the drawings or herein described.

Although in the above description I have mentioned a number of tubes or pipes as "flexible tubes," it is not necessary that the tubes so mentioned or described should be flexible. The only reason for using such is their great convenience.

The purifier and saturator are retained in place by frames 58, which serve as supports to the entablature 59, Figs. 1 and 5, upon which the lantern 40 is placed.

When the apparatus is not in use, the vessel $h$ being empty, the whole of the parts, generator $s$, purifier 10, saturator 50, with frames 58, entablature 59, lamp 40, and lamp $d$, can be packed within the box $a$, the portion or top part of the front of the box being turned up to a vertical position, and therefore the whole apparatus is contained within the plain rectangular box $a$.

What I claim as my invention, and wish to secure by Letters Patent, is as follows:

1. The combination, in an oxycalcium-light apparatus, of the vessel $e$ with the vessel $f$, having projection $l$, diaphragm $g$, with guiding-tube $k$, passage $o$, relief-valve $n$, and vessel $h$, adapted to be supplied with water as a weight, the whole substantially as described.

2. The combination, in a purifier for oxycalcium-light apparatus, of the outer tube 11, perforated tube 16, and inner perforated tube 18 with a saturated sawdust filling 22, arranged to cause the gas to pass through the sawdust filling, the whole substantially as described.

3. The combination, in a calcium-light apparatus, of the vessels adapted to form a gas-receiver, and a pipe provided with an escape-valve, also with a generator, a regulator for governing the pressure of the gas, a purifier, and adjustable means for dividing the gas into two streams, the whole substantially as described, and for the purposes set forth.

4. The combination, in an oxycalcium-light gas-pressure regulator, of the socket 26, having a valve-seat, pipe 27, disk 30, diaphragm 31, and weight 38, with the valve 33, having hollow spindle 34, provided with perforations 35, the whole substantially as and for the purposes set forth.

GEORGE ROGER PROWSE.

Witnesses:
CHARLES G. C. SIMPSON,
A. BRODERICK.